(12) United States Patent
Faure (10) Patent No.: US 7,048,417 B1
(45) Date of Patent: May 23, 2006

(54) ADJUSTABLE DESK LAMP

(75) Inventor: Matthew Faure, Bozeman, MT (US)

(73) Assignee: Matthew C. Faure, Bozeman, MT (US)

( * ) Notice: Subject to any disclaimer, the term of this patent is extended or adjusted under 35 U.S.C. 154(b) by 60 days.

(21) Appl. No.: 10/857,131

(22) Filed: May 28, 2004

(51) Int. Cl.
*F21S 8/08* (2006.01)
*F16M 13/00* (2006.01)

(52) U.S. Cl. ............... 362/413; 362/270; 362/418; 362/419; 362/427; 362/431; 248/124.1; 248/278.1

(58) Field of Classification Search ............... 362/413, 362/418, 427, 431, 428, 419, 270; 248/124.1, 248/231.31, 295.11, 447.1
See application file for complete search history.

(56) References Cited

U.S. PATENT DOCUMENTS

| | | | | |
|---|---|---|---|---|
| 1,474,304 A | * | 11/1923 | Weber | 362/413 |
| 1,625,100 A | * | 4/1927 | Runge | 248/295.11 |
| 2,616,029 A | * | 10/1952 | Osowski | 362/59 |
| 4,238,818 A | | 12/1980 | Gindel | 362/413 |
| 4,327,402 A | | 4/1982 | Aubrey | 362/288 |
| 4,386,393 A | * | 5/1983 | Pike | 362/427 |
| 4,605,995 A | * | 8/1986 | Pike | 362/287 |
| 4,932,620 A | * | 6/1990 | Foy | 248/124.1 |
| 5,169,226 A | | 12/1992 | Friedman | 362/190 |
| 5,203,622 A | | 4/1993 | Sottile | 362/109 |
| 5,325,278 A | | 6/1994 | Tortola et al. | 362/109 |
| 5,369,560 A | | 11/1994 | Friedman | 362/396 |
| 5,379,201 A | | 1/1995 | Friedman | 362/191 |
| 5,615,945 A | | 4/1997 | Tseng | 362/226 |
| 5,655,833 A | * | 8/1997 | Raczynski | 362/419 |
| 5,669,694 A | | 9/1997 | Morton, Sr. | 362/33 |
| 5,722,754 A | | 3/1998 | Langner | 362/1 |
| 5,868,487 A | | 2/1999 | Polley et al. | 362/33 |
| 6,089,724 A | | 7/2000 | Shore et al. | 362/85 |
| 6,152,578 A | | 11/2000 | Hoffman et al. | 362/285 |
| 6,168,292 B1 | | 1/2001 | Sherman | 362/287 |
| 6,467,936 B1 | | 10/2002 | Golemba | 362/413 |
| 6,481,871 B1 | | 11/2002 | Jamison | 362/287 |

\* cited by examiner

*Primary Examiner*—Alan Cariaso
*Assistant Examiner*—James W Cranson, Jr.
(74) *Attorney, Agent, or Firm*—Shane P. Coleman; Holland & Hart (57) ABSTRACT

An adjustable lamp is disclosed having a rod and a light assembly that slideably connects to the rod at a connection assembly. The light assembly includes a housing and a light socket contained within the housing. The light assembly further includes an extension member that connects the housing to the connection assembly. The connection assembly moves along the rod laterally along a longitudinal axis. The connection assembly may be locked into a position along the rod. For example, the rod may be connected to a vertical surface and a light source contained in the housing may be directed downward, toward a desk or table or other horizontal surface. The slideable connection allows the light assembly to move up or down relative to the horizontal surface in this use.

34 Claims, 10 Drawing Sheets

ADJUSTABLE DESK LAMP

FIELD OF INVENTION

The present invention relates generally to lamps and aesthetic lighting for use with desks or tables. More particularly, it relates to task lighting mounted to a vertical surface such as a side of a computer monitor or a wall, for illuminating a surface below the lighting, such as a desk.

BACKGROUND

Various types of lamps are known for lighting desks, tables, and other working surfaces. Examples of such lamps and lighting systems include overhead lights, floor lamps, aesthetic lighting, and desk lamps. Existing lamps and lighting systems have various disadvantages when used to illuminate desks or other working surfaces. Existing desk lamps typically include a large base that must rest on the desk, consuming valuable working space. Also, existing lamps are not sufficiently adjustable to provide task lighting to the user's workspace. Sometimes existing lamps produce an undesirable glare on a computer monitor also resting on the desk. What is needed is an improved lamp for providing task lighting to a desk.

SUMMARY

An adjustable lamp is disclosed having a rod and a light assembly that slideably connects to the rod at a connection assembly. The light assembly includes a housing and a light socket contained within the housing. The light assembly further includes an extension member that connects the housing to the connection assembly. The connection assembly moves along the rod laterally along a longitudinal axis. The connection assembly may be locked into a position along the rod. For example, the rod may be connected to a vertical surface and a light source contained in the housing may be directed downward, toward a desk or table or other horizontal surface. The slideable connection allows the light assembly to move up or down relative to the horizontal surface in this use.

In one embodiment, an adjustable lamp is disclosed having a rod and a means for mounting the rod to a vertical surface. The rod has a longitudinal axis and is positioned in a spaced-apart, parallel orientation relative to the vertical surface. The lamp also includes an extension member having first and second ends. The extension member extends outward from the rod. A light housing is connected to the first end of the extension member, and a connector is connected to the second end. The connector has first and second ends separated by a mid-portion. The first end has a hole through which the rod passes. In use, the connector slides along the rod, thereby changing the position of the light assembly relative to the rod.

In one embodiment, an adjustable lamp is disclosed having a bracket assembly, a connection assembly, and a light assembly. The bracket assembly includes an elongated mounting plate adapted to connect to a vertical surface and a hollow rod having a longitudinal axis. The rod has first and second ends that connect, respectively, to first and second ends of the mounting plate. The longitudinal axis of the rod is substantially parallel to the mounting plate and is positioned in a spaced-apart orientation relative to the mounting plate. The light assembly includes a housing having a light socket and an extension member that extends the housing away from the bracket assembly. The first end of the extension member is pivotally connected to the housings. The second end is connected to a connection assembly that connects the light assembly to the bracket assembly. The connection assembly includes a connector having first and second ends and a mid-portion. The ends have holes that are aligned with each other, and the rod passes through the holes. The mid-portion is pivotally connected to the second end of the extension member. A lock controls the pivotal connection between the mid-portion and the extension member and secures the extension member to connector at an angle relative to the longitudinal axis of the rod. The angle between the rod and the extension member is within a range of angles that includes a 90-degree angle between the rod and the extension member. The connection assembly also includes a light position control that has a lever end and a locking end. The locking end engages the rod and holds the connection assembly in a position along the rod when the light position control is in a locked position. The light position control is connected to the connector at a pivot point such that the lever end extends from the pivot point and may be moved in first and second directions about the pivot point to cause the locking end to engage and disengage the rod, respectively. A spring urges the light position control into the locked position. The lamp further includes a cord adapted to supply power to the light socket. The cord includes a portion that passes through the inside of the rod, from the first end of the rod to the second end. The cord also includes a coil portion that extends from the second end of the rod to the connector and a straight portion that extends from the connector to the housing. The coil portion is extended when the connector is positioned near the first end of the rod and is retracted when the connector is positioned near the second end of the rod.

In one embodiment, a lamp is disclosed having a rod, a light assembly, and a means for slideably connecting the light assembly to the rod. The rod includes a longitudinal axis. The light assembly moves laterally relative to the rod, along the longitudinal axis. The lamp further includes a means for locking the light assembly in place at one of a plurality of positions along the longitudinal axis of the rod.

SUMMARY OF DRAWINGS

The detailed description will refer to the following drawings, wherein like numerals refer to like elements, and wherein.

DETAILED DESCRIPTION

Figure 1:
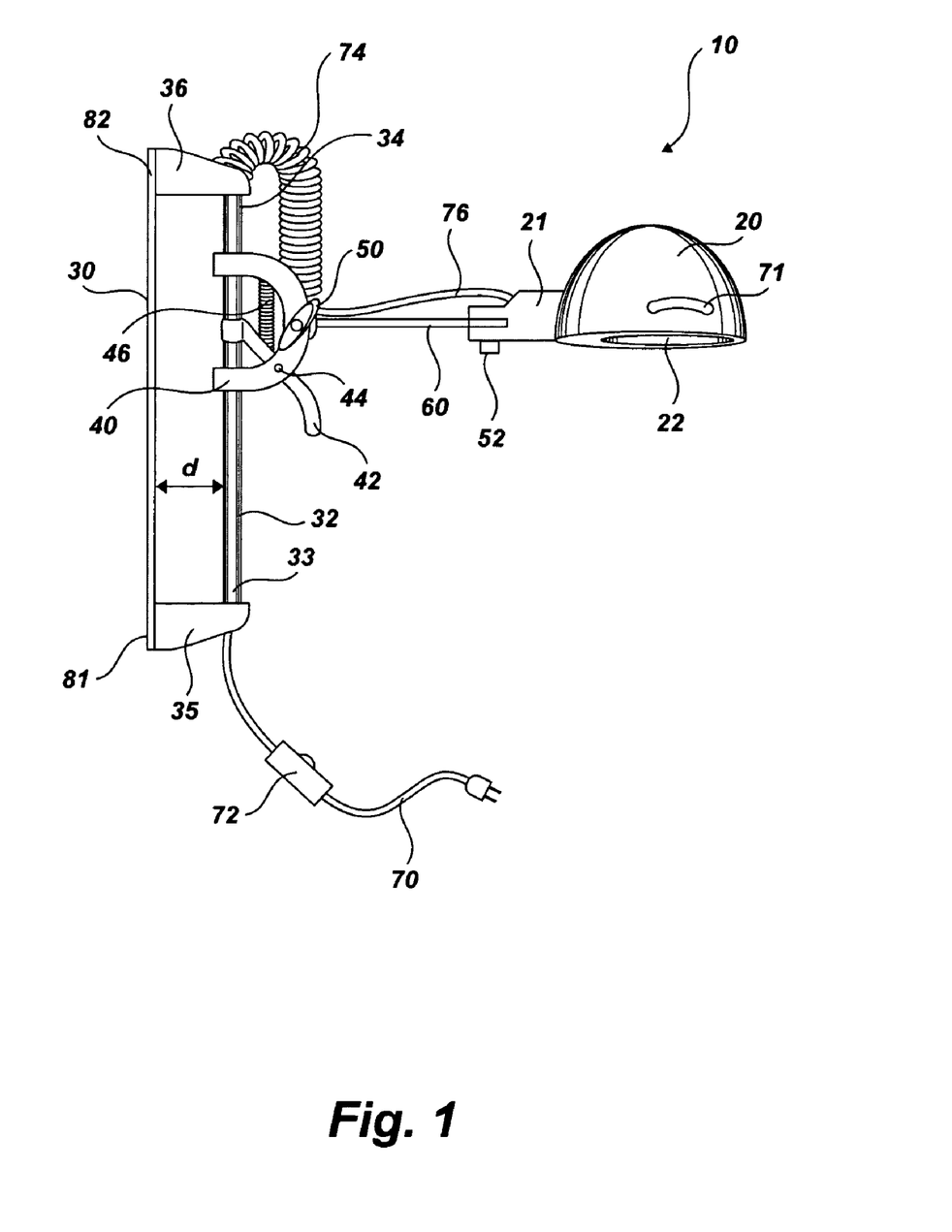
FIG. 1 is a side view of an adjustable lamp.

FIG. 1 is a side view of an adjustable lamp 10. The lamp 10 broadly includes a bracket assembly, a light assembly, and a connection assembly that connects the bracket assembly to the light assembly. The bracket assembly attaches the lamp 10 to a wall or other vertical surface, such as a bookcase or a computer monitor. The light assembly provides light to a user's workspace. The connector assembly connects the light assembly to the bracket assembly and allows the light assembly to move relative to the bracket assembly.

In the example of FIG. 1, the bracket assembly includes a mounting plate 30 that is adapted to mount to a vertical surface, such as a wall or a side of a computer monitor. In one embodiment, the mounting plate 30 is substantially flat and straight. In another embodiment, the mounting plate 30 is curved and/or flexible to connect to a curved vertical surface. The mounting plate 30 may be attached to the vertical surface, for example, using a temporary connections such as reciprocal hook and loop fasteners (e.g., VELCRO), adhesive, double-sided tape, etc., or may be permanently mounted to the wall or other vertical surface.

The bracket assembly further includes a rod 32 that is positioned in a spaced-apart orientation relative to the vertical surface (not shown). In one embodiment, the rod 32 has a length in the range of 6–18 inches. In the embodiment shown, the rod 32 is hollow and has a round, gear-like cross-section, and the connector 40 (described further herein) is allowed to rotate about the rod 32, subject to limitations imposed by the light position control 42 (described further herein). In other examples, the rod 32 may be square or may have another shape that does not permit such rotation. In the example of FIG. 1, the mounting plate 30 is an elongated, flat plate, and the rod 32 has a longitudinal axis that runs parallel to the mounting plate 30. Spacers 35, 36 connect the rod 32 to the mounting plate 30. In the example of FIG. 1, the rod 32 is spaced apart from the mounting plate 30 by a distant d. In one embodiment, the distance d is in the range of 0.5–4.0 inches.

In the example of FIG. 1, the rod 32 has first and second ends 33, 34 that connect to the first and second spacers 35, 36, respectively, which in turn connect to first and second ends of the elongated mounting plate 30 in this example. Together, the mounting plate 30, the rod 32, and the spacers 35, 36 form the bracket assembly in the example of FIG. 1. In another embodiment, the lamp 10 does not include a mounting plate 30 but instead the spacers 35, 36 connect directly to the vertical surface.

The light assembly in FIG. 1 includes a light housing 20 that holds a light socket (not shown). As used herein, the term "light socket" refers to any receptacle or other device adapted to hold a light source, such as a light bulb. The housing 20 surrounds the receptacle (not shown) in example in FIG. 1, and a translucent cover 22, such as a glass cover, is connected to the housing 20 to allow light to pass through the cover 22. The light assembly also includes a connection portion 21 connected to the housing 20 and an extension member 60 that extends the housing 20 out away from the rod 32. The example of FIG. 1 also includes a handle 71 connected to the housing 20 to adjust the position of the lamp 10.

In example of FIG. 1, the extension member 60 is connected to the connection portion 21 at a pivotal connection 52. The pivotal connection 52 allows the housing 20 to rotate relative to the extension member 60 in a plane that contains the extension member 60 and the housing 20, which plane is generally normal to the direction that light is directed from the housing 20. In the example of FIG. 1, the extension member 60 extends in a direction substantially perpendicular to the rod 32, and thus the pivotal connection 52 would allow the housing 20 to rotate relative to the extension member 60 in a plane that is substantially perpendicular to the rod 32. As described herein, the extension member 60, in some embodiments, may be positioned throughout a range of angles relative to the rod 32 and may not necessarily be perpendicular to the rod 32.

The connection assembly shown in FIG. 1 includes a connector 40 that connects to the rod 32 to allow the housing 20 to move laterally relative to the rod 32. The connector 40 allows the housing 20 to move lengthwise along the rod 32 (e.g., up and down when the lamp 10 is connected to a vertical surface). The connector 40 also allows the housing 20 to rotate about the rod 32. The connector 40 includes first and second ends that wrap around the rod 32 and a mid-portion that connects to the extension member 60. In example of FIG. 1, the extension member 60 is pivotally connected to the connector 40 and may be locked into position by a lock 50. In an example of FIG. 1, the lock 50 tightens to hold the extension member 60 in place. By releasing the lock 50 the extension member 60 may be rotated in a plane parallel to the rod 32 in a range of angles, including the 90-degree angle of the extension member 60 relative to the rod 32, as shown in FIG. 1. In the orientation shown in FIG. 1, the extension member 60 may be pivoted up or down about the connector 40, as described further herein with respect to FIG. 10.

The connection assembly in FIG. 1 also includes a light position control 42 that controls the position of the light assembly along the length of the rod 32. In the example of FIG. 1, the light position control 42 is pivotally connected to the connector 40 at a pivotal connection 44. One end of the position control 42 engages the rod 32 and holds the connection assembly and light assembly at a position along the rod 32. A spring 46 urges the light position control 42 into locked position in which the light position control 42 engages the rod 32 and holds the connection assembly and light assembly in position along the rod 32. By exerting a force opposite the spring force on the other end of the light position control 42, the light position control disengages the rod 32 in a release position and allows the light assembly and connection assembly to move relative to the rod 32, axially up and down.

In use, the connector 40 moves laterally along the longitudinal axis of the rod 32. Holes in the connector 40 guide the connector 40 along the length of the rod 32, as the connector 40 slides relative to the rod 32. The connection assembly and light assembly move with the connector 40, laterally along the length of the rod 32. The connector 40 slides along the rod 32 through a continuous set of points along the rod 32. That is, the connector 40 may be stopped and locked into position using the light position control 42 at any point along rod 32, as opposed to limiting the position of the connector 40 to discrete connection points along the rod 32. In an alternative embodiment, the position of the connector 40 may be limited to such discrete points along the rod 32.

In the example of FIG. 1, power is provided to the light housing 20 by a cord 70. The cord 70 connects at one end to a conventional duplex outlet and includes a switch 72 for controlling power to the light housing 20. In one embodiment, the lamp 10 uses a low voltage power supply, and the cord 70 includes a transformer (not shown) to convert the power to a DC voltage. In example of FIG. 1, the rod 32 is hollow and spacers 34, 36 include holes aligned with the hollow interior of the rod 32. The hollow rod 32 and the holes in the spacers 35, 36 allow the cord 70 to pass through the interior of the rod 32, running from the first end 33 of the rod 32 to the second end 34 of the rod 32. At the second end 34 a coiled portion 74 of the cord 70 extends when the light assembly is in a lower position along the rod 32 and retracts when the light assembly is in a higher position along the rod 32, in the example of FIG. 1. In one embodiment (not shown) a spring is used to retract the cord 70. In one embodiment (not shown) a sleeve is used to cover the cord 70. The coil portion 74 connects from the second end 34 of the rod 34 to the connector 40. A straight portion 76 of the cord 70 extends generally along the extension member 60 from the connector 40 to the connection portion 21 of the housing 20. Inside the housing 20, the cord 76 connects to the light socket (not shown).

Figure 2:
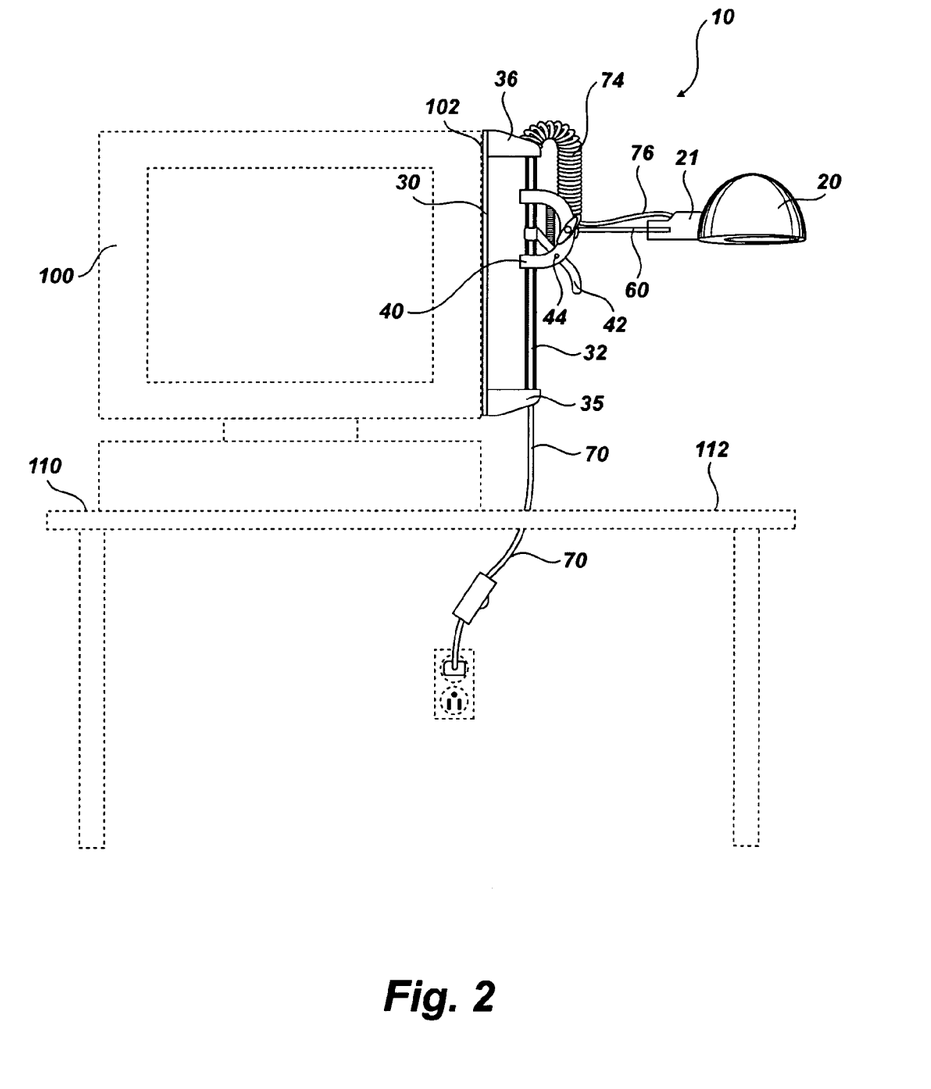
FIG. 2 shows the lamp in use with a computer monitor resting on a desk.

FIG. 2 shows the lamp 10 in use with a computer monitor 100 resting on a desk 110. The desk 110 includes a working surface 112 adjacent the monitor 100. In the example of FIG. 2, the cord 70 is connected to a duplex outlet and provides power to the light housing 20. In the example of FIG. 2, the extension member 60 is positioned substantially perpendicular to the rod 32. The rod 32 is positioned substantially vertical and parallel to the computer monitor side 102, to which the mounting bracket 30 is attached. In one embodiment, the mounting bracket 30 is curved and/or flexible to allow attachment to a curved surface, such as a convex side of a computer monitor. The housing 20 controls the direction of the light from the light socket (not shown) contained within the housing 20. Light is directed in a direction generally perpendicular to the extension member 60 in the example of FIGS. 1 and 2. In the configuration of FIG. 2, the rod 32 is substantially vertical, the extension member 60 extends substantially perpendicular to the rod 32, and light is directed straight downward toward the horizontal working surface 112. The light emitted from the lamp 10 may be adjusted using the light position control 42 to move the light housing 20 higher or lower relative to the working surface 112. By mounting the lamp 10 on a side 102 of the monitor 100, the lamp 10 provides light to the working surface 112 without creating a glare or otherwise interfering with the monitor 100. Also, the lamp housing 20 directs light downward in this embodiment and prevents light from escaping in other directions that might bother the user of the computer monitor 100.

Figure 3:
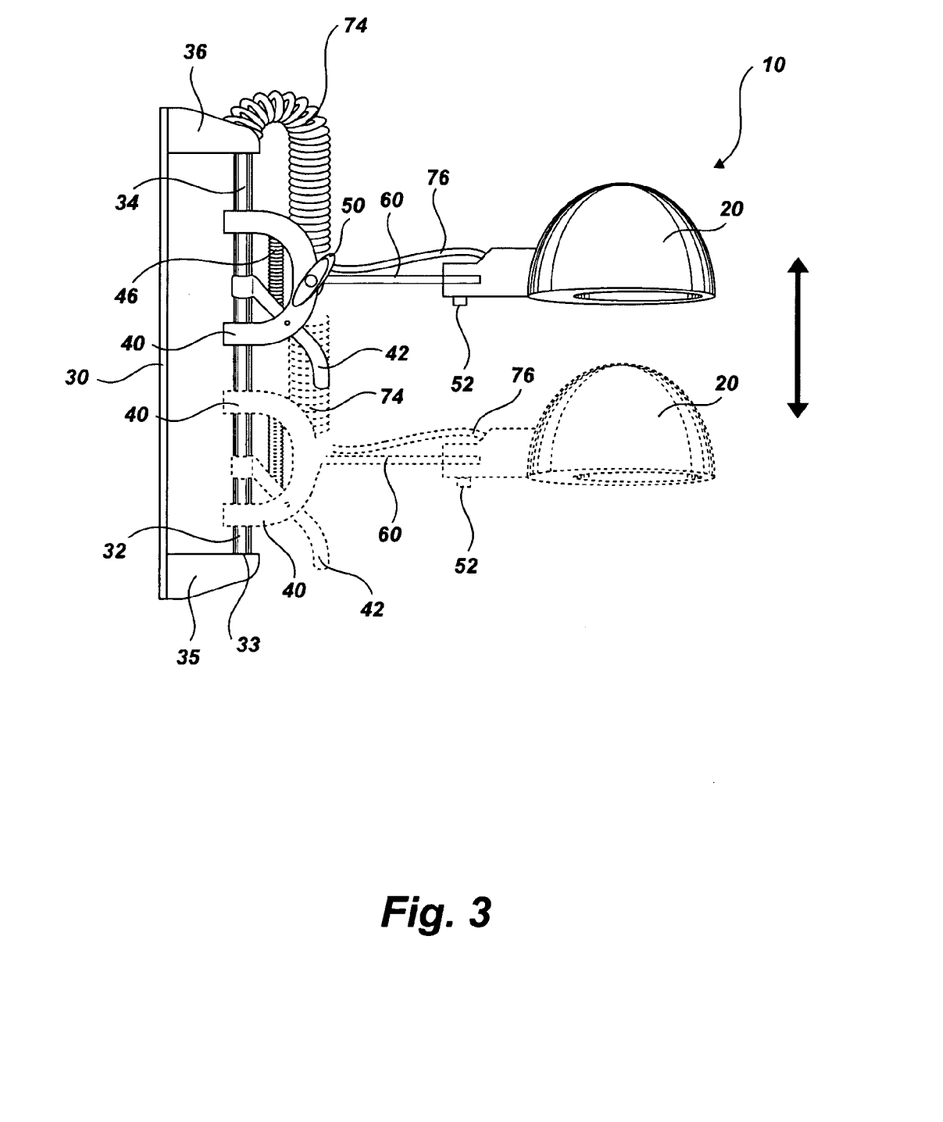
FIG. 3 shows the lamp described with respect to FIGS. 1–2, illustrating the slideable connection between the connector and the rod.

FIG. 3 shows the lamp 10 described with respect to FIGS. 1 and 2, illustrating the slideable connection between the connector 40 and the rod 32. As shown in FIG. 3, the connector 40 may be positioned in various places continuously along the length of the rod 32. This causes the light housing 20 and light source contained therein to be higher or lower when the lamp 10 is mounted to a vertical surface. As also shown in FIG. 3, the coil portion 74 of the cord 70 extends when the light housing 20 is in a lower position and retracts when the light housing 20 is in higher position, closer to the second end 34 of the rod 32.

Figure 4:
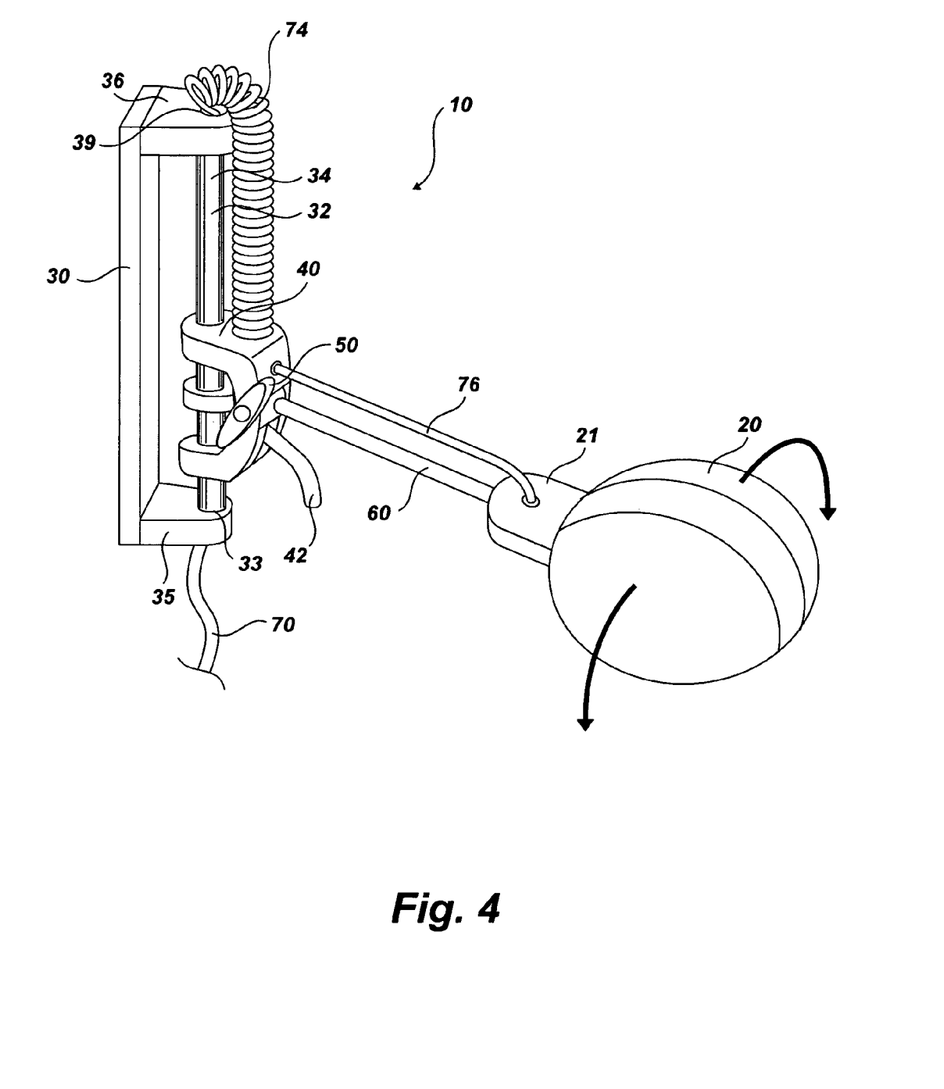
FIG. 4 shows a perceptive view of the lamp shown in FIGS. 1–3.

FIG. 4 shows a perspective view of the lamp 10 shown in FIGS. 1–3. As shown 4, the mounting bracket 30 is an elongated member that is substantially flat. Rod 32 connects to the spacers 35, 36 at first and second ends 33, 34, respectively. The spacers 35, 36 include holes (e.g., 39) aligned with the rod 32. As also shown in FIG. 4, the coiled portion 74 of the cord 70 connects to a mid-portion of the connector 90. The straight portion 76 of the cord 70 runs from the connector 40 to the connection portion 21 of the housing 20, where the cord 70 connects to the light socket (not shown). As shown by the arrows, the housing 20 also rotates, or twists, about the longitudinal axis of the extension member 60.

Figure 5:
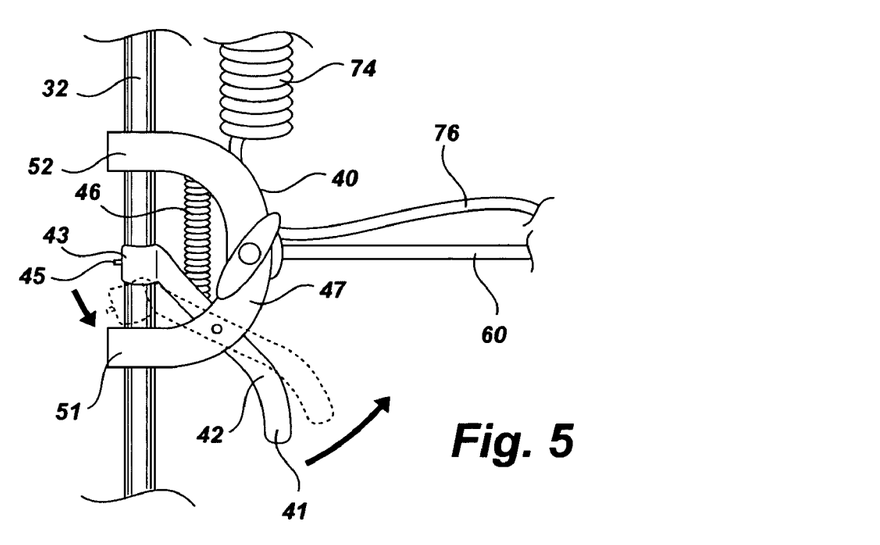
FIG. 5 shows a more detailed diagram of one embodiment of the connector assembly.

FIG. 5 shows a more detailed diagram of one embodiment of the connector assembly. The connector 40 includes first and second ends 51, 52 and a mid-portion 47. The extension member 60 connects to the mid-portion 47 of the connector 40 at one end of the extension member 60. The straight portion 76 of the cord 70 attaches to the connector 40 at the mid-portion 47. The first and second ends 51, 52 of the connector 40 include holes, or otherwise wrap a round the rod 32. As also shown in FIG. 5, the light position control 42 includes a lever end 41 and a locking end 43.

As illustrated by the dashed lines, the lever end 41 may be urged relative to the pivotal connection (44 in FIG. 1) to move the locking end 43 into a release position shown by the dashed lines. The spring 46 connects the light position control 42 to the connector 40 and urges the locking end 43 into a locked position as shown in FIG. 5, in which the locking end 43 engages the rod 32. In the embodiment of FIG. 5, the light position control 42 is urged to the release position by urging the lever end 41 in a direction generally away from the rod 32 and up, toward the second end 34 of the rod 32. This allows the user to release the light position control 42 and move the connector 40 up or down relative to the rod 32 using only one hand.

As also shown in FIG. 5, the locking end 43 includes a pin 45 that engages the rod 32. As described further herein, the pin 45 fits between ridges that are used in one embodiment of the rod 32 to allow the connector 40 to remain locked in position such that the connector 40 does not twist relative to the rod 32 when the light position control 42 is in a locked position.

Figure 6:
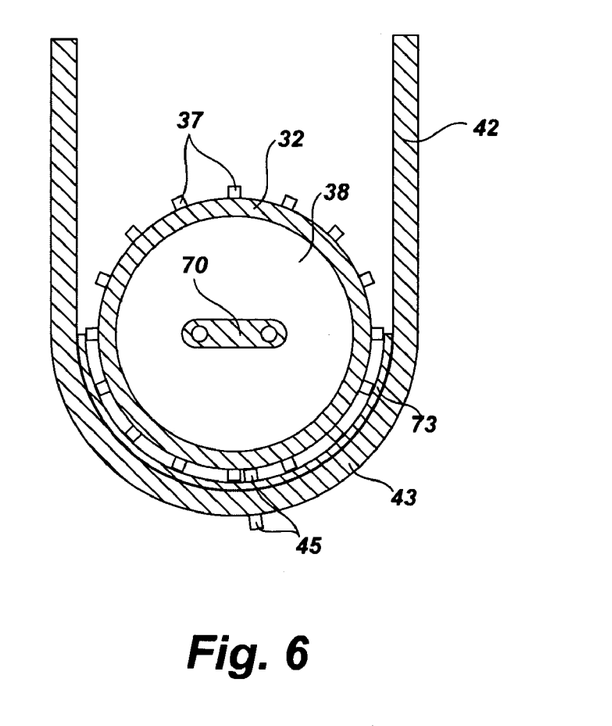
FIG. 6 illustrates one embodiment of the rod having a plurality of ridges running along the length of the rod.

FIG. 6 illustrates one embodiment of the rod 32 having a plurality of ridges 37 running along the length of the rod 32. As shown in FIG. 6, the rod 32 is hollow and the cord 70 passes through the interior portion 38 of the rod 32. The light position control 42 is shown in FIG. 6 in a locked position in which the locking end 43 has engaged the rod 32. The embodiment of FIG. 6 includes a pin 45 that passes through the locking end 43 of the light position control 42. The pin 45 fits between two of the ridges 37 when the light position control 42 is in a locked position. The pin 45 and ridges 37 prevent the connector 40 from pivoting about the rod 32 in the locked position. When the light position control 42 is in a release position, the connector 40 may be pivoted about the rod 32 to change the angle at which the extension member 60 protrudes outwardly from the rod 32 and the surface to which the lamp 10 is mounted.

The example of FIG. 6 also includes a brake 73 disposed inside the locking end 43. The brake 73 includes any piece of rubber or similar material that grips the rod 32 when the locking end 43 has engaged the rod 32 in the locked position. In one embodiment, the brake 73 is a piece of rubber having a thickness of approximately 1/16th of an inch. The brake 73 prevents the locking end 43 from inadvertently sliding down relative to the rod 32 in the locked position. The position of the brake on the locking end 43 allows the user to slide the connector 40 upward, along the rod 32 by pushing the entire connector 40 upward, because the upward motion loosens the connection between the brake 73 and the locking end 43. To lower the connector 40 in this embodiment, the light position control 42 must be moved to the release position because the brake 73 prevents the connector 40 from moving downward in the locked position.

Figure 7A:
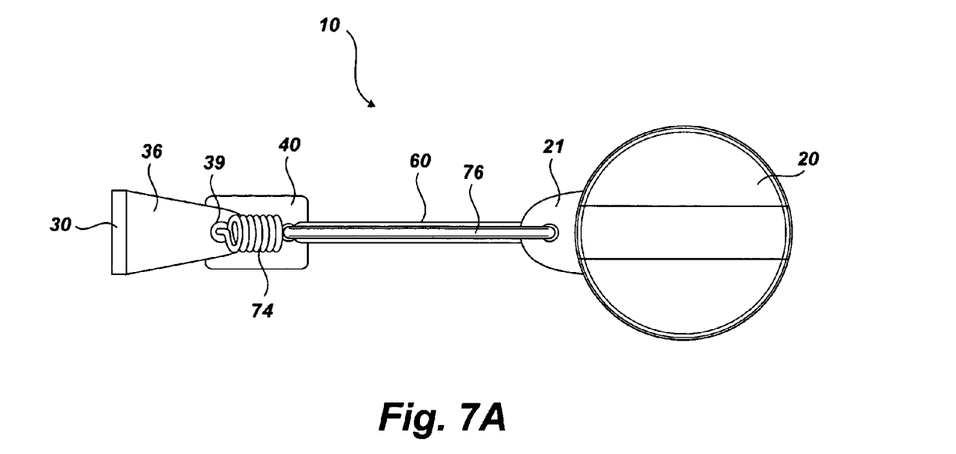
FIGS. 7A and 7B show top views of the lamp, illustrating how the connector may be pivoted about the rod in separate locked positions of the light position control.
Figure 7B:
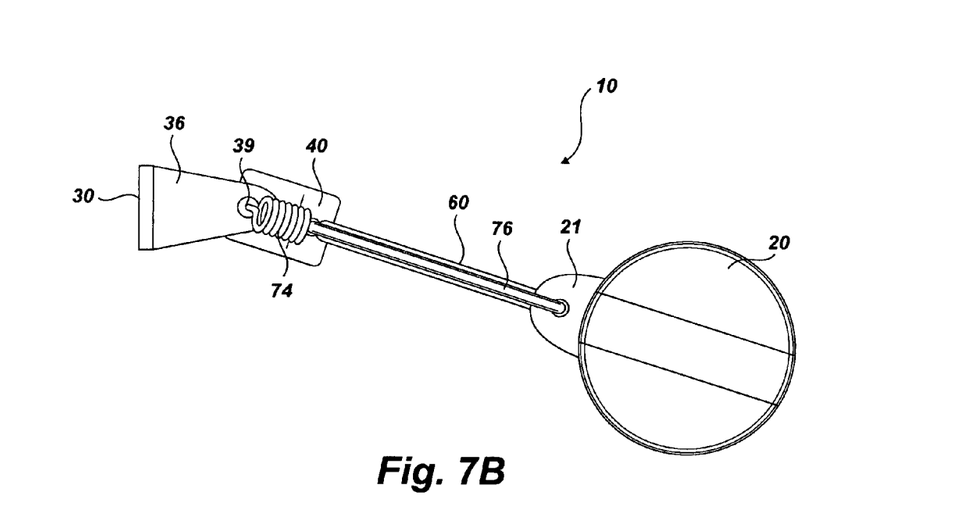

FIGS. 7A and 7B show top views of the lamp 10, illustrating how the connector 40 may be pivoted about the rod 32 in separate locked positions of the light position control 42. In the example of FIG. 7A, the extension member 60 extends generally outwardly from the vertical surface to which the mounting plate 30 attaches, such that the extension member 60 would be substantially perpendicular to the vertical surface. In example of FIG. 7B, the light position control 42 has been released to allow the connector 40 to pivot about the rod 32 into a different orientation of the extension member 60 relative to the vertical surface.

Figure 8A:
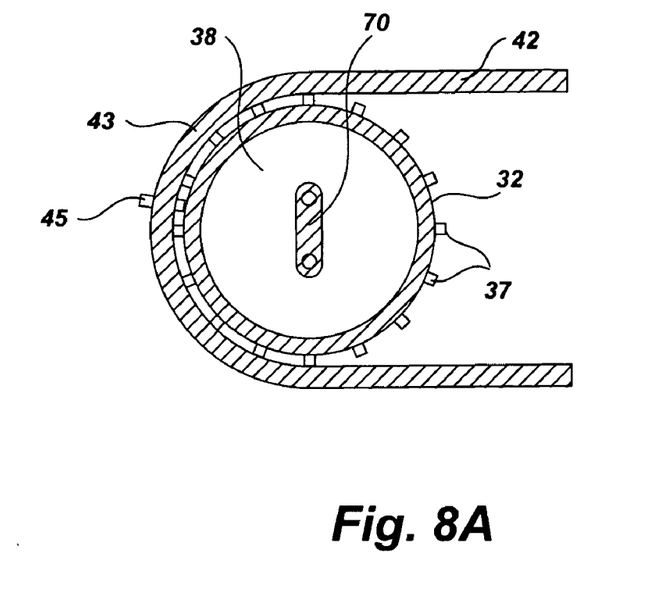
FIGS. 8A and 8B illustrate the position of the light position control for the example positions of 7A and 7B.
Figure 8B:
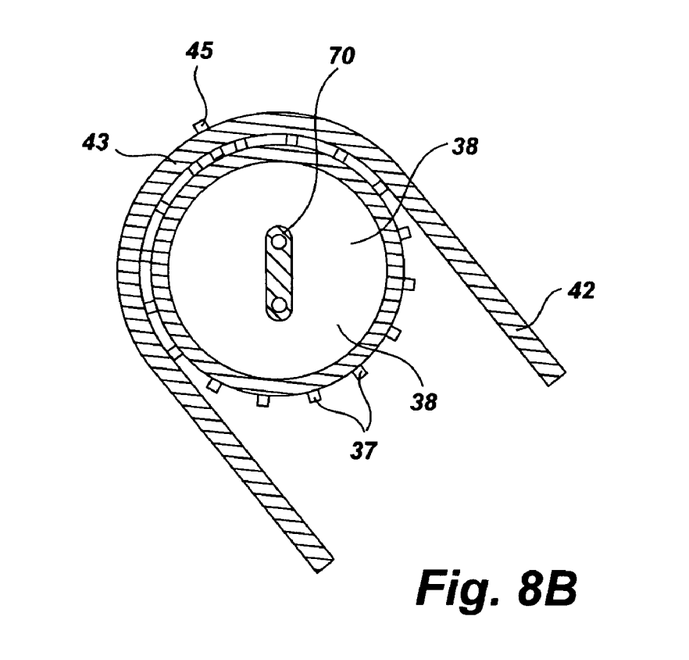

FIGS. 8A and 8B illustrate the position of the light position control 42 for the example position of 7A and 7B. As shown in FIG. 8A, the pin 45 is disposed between two of the ridges 37 of the rod 32, in a locked position. The light position control 42 may then be released, and the connector 40 may be rotated about the rod 32 to reach the new angle, such as the angle shown in FIG. 7B. At the new angle of FIG. 7B, the light position control 42 is again locked in a locked position in which the locking end 43 of light position control 42 engages the rod 32. In this new position of FIGS. 7B and 8B, the pin 45 has now engaged different ridges 37 of the rod 32.

Figure 9:
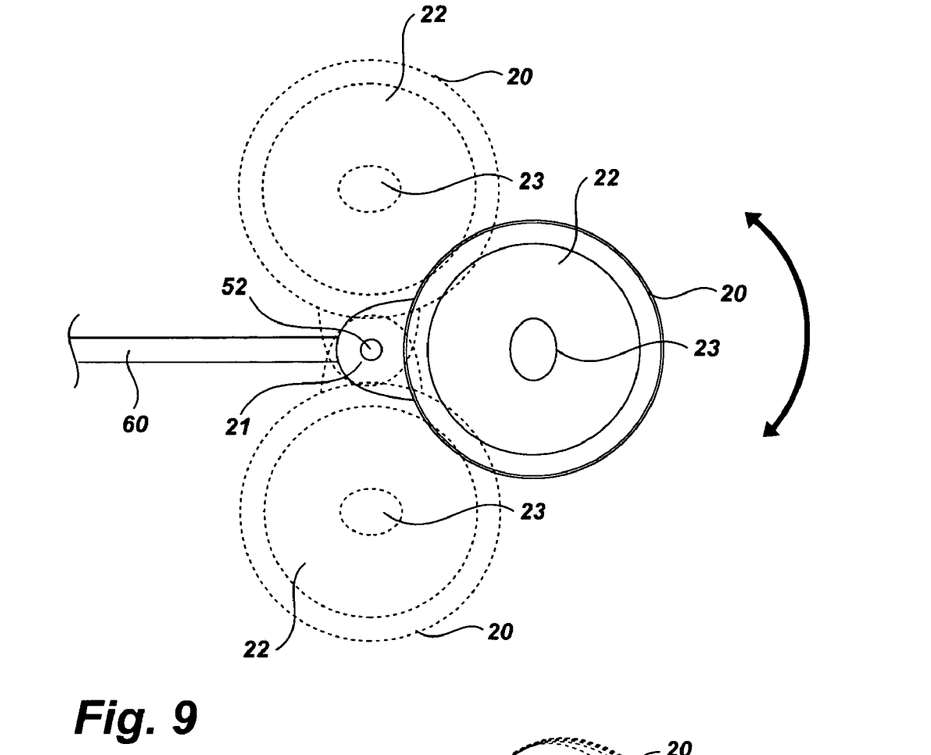
FIG. 9 shows a view of the bottom of the light assembly.

FIG. 9 shows a view of the bottom of the light assembly, including the light housing 20, the light source 23, and the cover 22. The extension member 60 is pivotally connected to a connection portion 21 of the housing 20 at a pivotal connection 52. As illustrated in FIG. 9, the light housing 20 may be pivoted about the pivotal connection 52, in the directions shown generally by the arrow. This allows the light housing 20 to move relative to the extension member 60, without moving the connector (40 in FIG. 1) or adjusting the lock (50 in FIG. 1).

Figure 10:
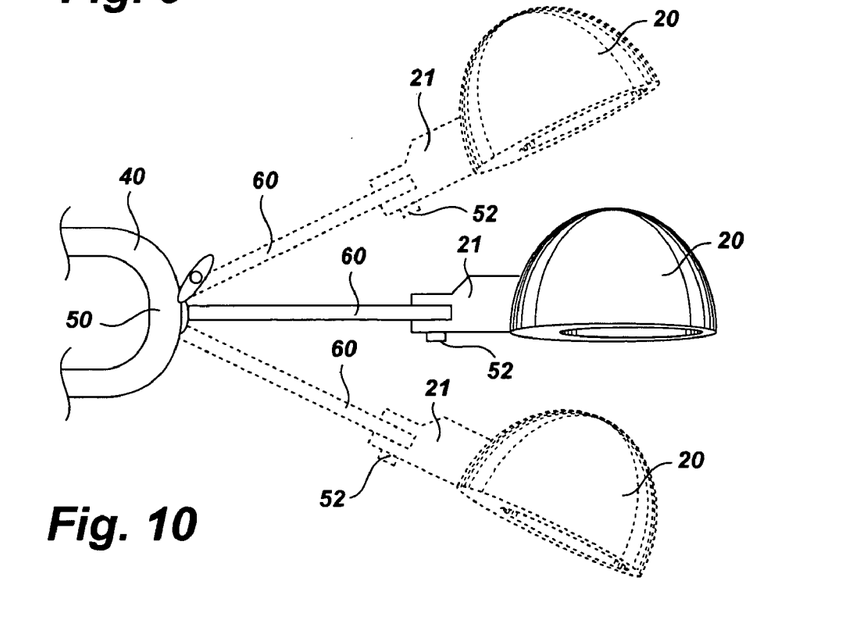
FIG. 10 illustrates use of the lock that allows the extension member and the housing to move within a plane containing the rod, through a range of angles relative to the rod.

FIG. 10 illustrates use of the lock 50 that allows the extension member 60 and the housing 20 to rotate within a plane containing the rod (32 in FIG. 1), within a range of angles relative to the rod (32 in FIG. 1). As shown in FIG. 10, the range of angles includes a 90-degree angle in which the extension member 60 extends substantially perpendicular to the rod (32 in FIG. 1). The lock 50 may be tightened to secure the extension member 60 at a particular angle within the range of angles. In one embodiment the lamp 10 does not include a lock 50 and the extension member 60 is fixedly connected to the connector 40 at a fixed angle relative to the rod 32, such as a 90-degree angle. In another embodiment, the extension member 60 rotates about its longitudinal axis to turn or twist the housing 20, and the lock 50 holds the extension member 60 at a particular angle.

Figure 11:
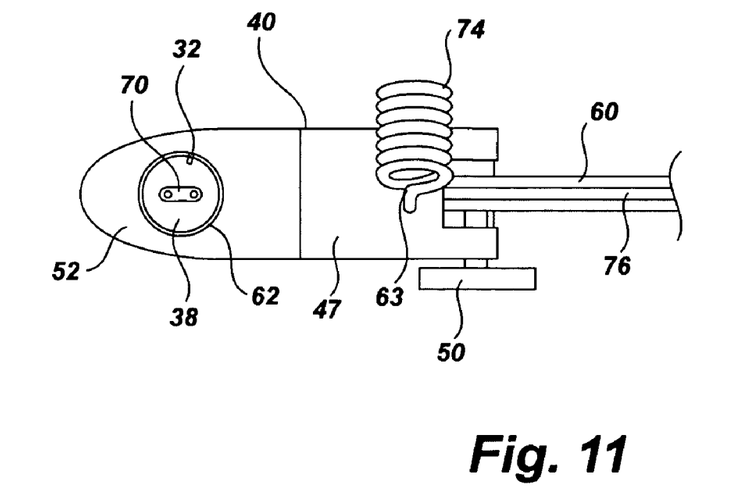
FIG. 11 shows a top view of the connector.

FIG. 11 shows a top view of the connector 40. The connector 40 includes a second end 52 having a hole 62 defined therein, and a mid-portion 47. The coil portion 74 of the cord 70 enters the connector 40 at a hole 63 at the mid-portion 47. The cord 70 passes through the connector 40 and a straight portion 76 of the cord 70 extends outwardly, generally along extension member 60. In example of FIG. 11, the rod 32 has a hollow interior 38 through which the cord 70 passes. The hole 62 has inside diameter that is slightly larger then the outside diameter of the rod 32 such that the hole 62 guides the connector 40 along the rod 32. Although not shown in FIG. 11, the connector 40 includes a first end (51 in FIG. 5) that also includes a hole (not shown) that is substantially aligned with a hole 62 in the second end 52. This allows the hollow interior of the rod 32 to align with both holes (e.g., 62).

Figure 12:
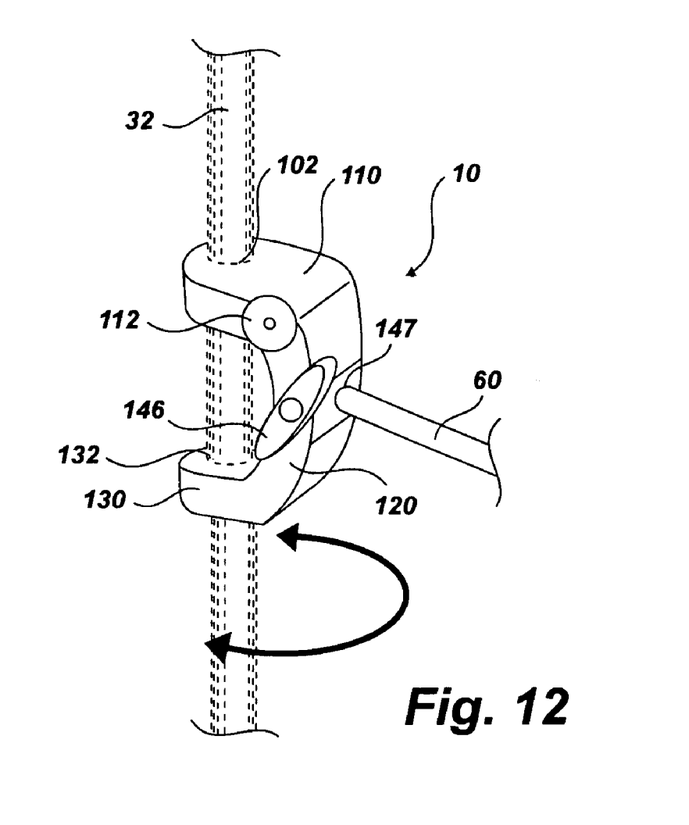
FIG. 12 shows an another embodiment of a connector for use in connection with the lamp described in FIG. 1.

FIG. 12 shows an another embodiment of a connector 100 for use in connection with the lamp 10 described in FIG. 1. The connector 100 includes a first end 110 having a hole 102 defined therein. The rod 32 (shown in dashed lines) passes through the hole 102. The extension member 60 pivotally connects to a mid-portion 147 of the body 120 of the connector 100. A lock 146 holds the extension member 60 in position relative to the connector 100. In the example of FIG. 12, the connector 100 is shown in the locked position in which a second end of the connector 100 engages the rod 32. A pin 132 prevents the connector 100 from rotating about the rod 32, in the locked position. In one embodiment, a spring (not shown) is used to urge the second end 130 toward the rod 32 into the locked position. In another embodiment, the rod 32 is adapted to be positioned generally vertical with the first end 110 above the second end 130, such that the weight of the other parts of the lamp (10 in FIG. 1), such as the extension member 60 and the housing (20 in FIG. 1), urge the second end 130 to the locked position. A brake (e.g., 73 in FIG. 6) may also be used in connection with the second end 130 to hold the connector 100 in position relative to the rod 32. In this embodiment, the body 120 and the second end 130 act as a light position control to control the position of the light assembly relative to the rod 32.

To adjust the position of the connector 100 relative to the rod 32, the user lifts the body 120 of the connector 100 to rotate the body 120 about the hinge 112, as indicated by the arrow. This disengages the second end 130 from the locked position—that is, the connector 100 is in the release position. With the connector 100 in the release position, the user can slide the connector 100 relative to the rod 32 and reengage the rod 32 with the second end 130 at the desired position.

Figure 13:
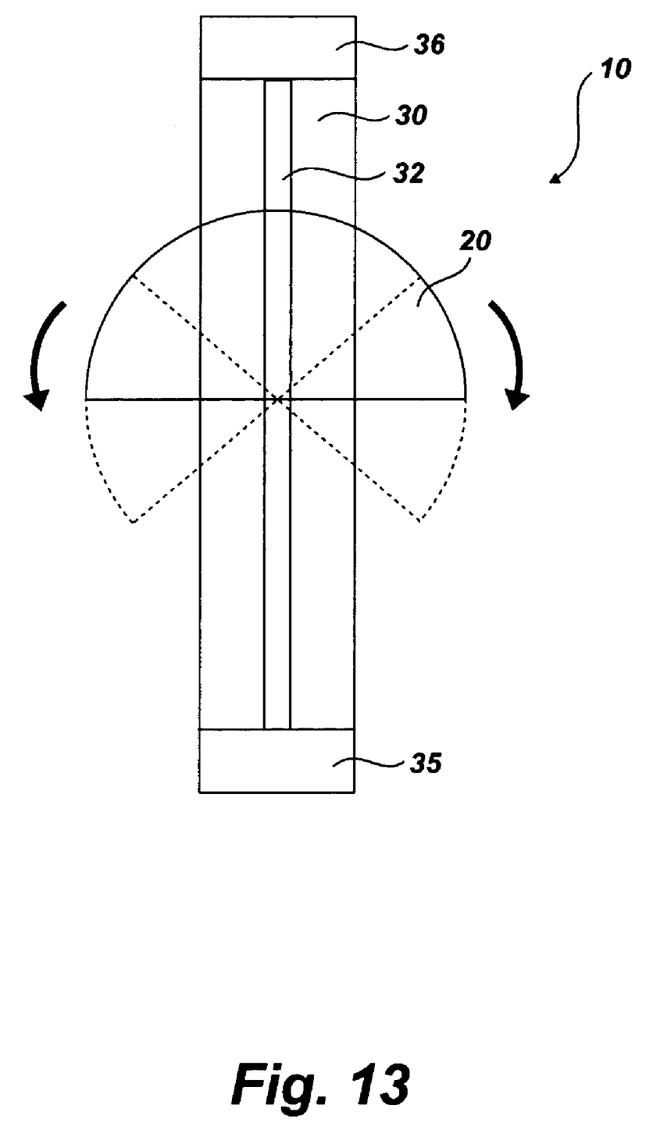
FIG. 13 shows an elevation view of the lamp.

FIG. 13 shows an elevation view of the lamp 10. As shown by the arrows and dashed lines in FIG. 13, the housing 20 pivots along the axis of the extension member (60 in FIG. 1).

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. An adjustable lamp comprising:
   a rod having a longitudinal axis;
   a light assembly comprising:
      a housing;
      a light socket contained within the housing; and
      an extension member that extends the housing outward from the rod; and
   a connection assembly that slideably connects the light assembly to the rod such that the connection assembly and light assembly may be positioned at a plurality of continuous points along the rod, wherein the connection assembly comprises a light position control comprising a lever end and a locking end, wherein the light position control operates in a locked position in which the locking end engages the rod and holds the light assembly in position at one of the plurality of continuous points and in a release position in which the connection assembly is allowed to move laterally along the longitudinal axis of the rod, and wherein the light position control comprises a spring that urges the light position control into the locked position, and wherein the lever end of the light position control releases the light position control into the release position when the lever end is urged outward from the rod.

2. The lamp of claim 1, further comprising a mounting plate that mounts the rod to a surface substantially parallel to the rod.

3. The lamp of claim 2, wherein the mounting, plate is flexible.

4. The lamp of claim 1, further comprising a brake that prevents the light assembly from sliding relative to the rod when the light position control is in the locked position.

5. An adjustable lamp comprising:
a rod having a longitudinal axis and is positioned in a spaced-apart, parallel orientation relative to a vertical surface;
means for mounting the rod to the vertical surface;
an extension member having first and second ends;
a light housing connected to the first end of the extension member; and
a connector connected to the second end of the extension member, wherein the connector has first and second ends separated by a mid-portion, wherein the first end has a hole defined therein, and wherein the rod passes through the hole,
wherein at least one of the first and second ends of the extension member comprises a pivotal connection that allows pivotal movement of the extension member.

6. The lamp or claim 5, further comprising a light position control that holds the connector in a position along the rod.

7. The lamp of claim 6, wherein the second end acts as the light position control by engaging the rod in a locked position and disengaging the rod in a release position.

8. The lamp of claim 6, wherein the second end of the connector comprises a hole aligned with the hole of the first connector, wherein the rod passes through the hole of the second connector, and wherein the light position control includes a locking end that engages the rod between the first and second ends of the connector.

9. An adjustable lamp comprising:
a rod having a longitudinal axis and is positioned in a spaced-apart, parallel orientation relative to a vertical surface;
means for mounting the rod to the vertical surface;
an extension member having first and second ends;
a light housing connected to the first end of the extension member;
a connector connected to the second end of the extension member, wherein the connector has first and second ends separated by a mid-portion, wherein the first end has a hole defined therein, and wherein the rod passes through the hole; and
a light position control that holds the connector in a position along the rod, wherein the light position control is pivotally connected to the connector and includes a lever end and a locking end, wherein the locking end may be pivoted relative to the connector into a locked position in which the locking end engages the rod and into a release position in which the locking end is separated from the rod.

10. The lamp of claim 9, further comprising a spring that urges the locking end to engage the rod.

11. The lamp of claim 9 wherein the rod has a plurality of ridges running generally along the longitudinal axis of the rod, and wherein the locking end of the light position control includes a pin that is received between two of the ridges in the locked position, such that the pin and the ridges prevent the connector from rotating about the rod when the light position control is in the locked position and allow the connector to rotate about the rod when the light position control is in the release position.

12. The lamp of claim 5, wherein the first end of the extension member is pivotally connected to the housing at a pivotal connection that allows the housing to rotate relative to the extension member in a plane perpendicular to a direction in which the light is directed.

13. The lamp of claim 5, wherein the second end of the extension member is pivotally connected to the connector at a pivotal connection that allows the extension member to rotate relative to the connector in a plane parallel to the longitudinal axis of the rod.

14. The lamp of claim 13, further comprising a lock that secures the extension member to the connector at an angle relative to the rod.

15. The lamp or claim 5, wherein the rod is substantially straight.

16. An adjustable lamp comprising:
a rod having a longitudinal axis and is positioned in a spaced-apart, parallel orientation relative to a vertical surface, wherein the rod has a hollow inside portion;
a power cord that passes through the hollow inside portion;
means for mounting the rod to the vertical surface;
an extension member having first and second ends;
a light housing connected to the first end of the extension member;
a connector connected to the second end of the extension member, wherein the connector has first and second ends separated by a mid-portion, wherein the first end has a hole defined therein, and wherein the rod passes through the hole.

17. An adjustable lamp comprising:
a rod having a longitudinal axis and is positioned in a spaced-apart, parallel orientation relative to a vertical surface;
means for mounting the rod to the vertical surface;
an extension member having first and second ends;
a light housing connected to the first end of the extension member;
a connector connected to the second end of the extension member, wherein the connector has first and second ends separated by a mid-portion, wherein the first end has a hole defined therein, and wherein the rod passes through the hole; and
a power cord, the power cord having a coiled portion that connects to the second end of the rod and to the connector.

18. The lamp of claim 17, wherein the means for mounting comprise a substantially flat, elongated mounting bracket that runs generally parallel to the rod, and wherein the rod has a length in the range of 6 to 18 inches.

19. The lamp of claim 17, wherein the second end of the extension member is fixedly connected to the connector at an angle that is substantially perpendicular to the rod.

20. The lamp of claim 17, further comprising a light socket contained within the light housing, and wherein the light housing directs light in a direction substantially perpendicular to the extension member.

21. An adjustable lamp comprising:
a bracket assembly comprising:
- an elongated mounting plate adapted to connect to a vertical surface;
- a hollow rod having a longitudinal axis with first and second ends that connect, respectively, to first and second ends of the mounting plate, wherein the longitudinal axis of the rod is substantially parallel to the mounting plate, and wherein the rod is spaced from the mounting plate, a light assembly comprising:
- a housing having a light socket;
- an extension member that extends the housing out from the bracket assembly, wherein the extension member has first and second ends and wherein the first end is pivotally connected to the housing;

a connection assembly that connects the light assembly to the bracket assembly, comprising:
- a connector having first and second ends and a mid-portion, each of the ends having a hole defined therein, wherein the rod passes through the holes, and wherein mid-portion is connected at a pivotal connection to the second end or the extension member;
- a lock that controls the pivotal connection and secures the extension member to the connector at an angle relative to the longitudinal axis of the rod, wherein the angle is within a range of angles that includes a 90-degree angle between the rod and the extension member;
- a light position control having a lever end and a locking end, wherein the locking end engages the rod and holds the connection assembly in a position along the rod when the light position control is in a locked position, and wherein the light position control is connected to the connector at pivot point, wherein the lever end extends from the pivot point and may be moved in first and second directions about the pivot point to cause the locking end to engage and disengage, respectively, the rod;
- a spring that urges the light position control into the locked position; and a cord adapted to supply power to the light socket, the cord comprising:
  - a portion that passes through the inside of the rod, from the first end of the rod to the second end;
  - a coil portion that extends from the second end of the rod to the connector; and
  - a straight portion that extends from the connector to the housing,
  wherein the coil portion is extended when the connector is positioned near the first end of the rod and is retracted when the connector is positioned near the second end of the rod.

22. The lamp of claim 21,
wherein the rod has a substantially round cross-section and comprises a plurality of ridges running along the longitudinal axis, and
wherein the locking end of the light position control includes a pin that is received between two of the ridges on the rod when the light position control is in the locked position to prevent the connection assembly from rotating about the rod.

23. The lamp of claim 21, wherein the rod is substantially straight.

24. The lamp of claim 21, wherein the bracket assembly further comprises a releasable fastener that releasably connects the mounting plate to the vertical surface.

25. A lamp comprising:
- a rod having a longitudinal axis and a substantially round cross-section;
- a light assembly comprising a housing and a light socket;
- means for slidably connecting the light assembly to the rod such that the light assembly may move laterally relative to the rod, along the longitudinal axis, wherein the means for slidably connecting comprises means for allowing the light assembly to rotate about the longitudinal axis of the rod
- means for locking the light assembly in place at one of a plurality of continuous points along the longitudinal axis of the rod; and
- means for limiting rotation of the light assembly about the longitudinal axis.

26. The lamp of claim 25, further comprising a means for mounting the rod parallel to a vertical surface.

27. The lamp of claim 26, further comprising means for preventing the light assembly from moving laterally relative to the rod, when the light assembly is in the locked position.

28. The lamp of claim 26,
wherein the light assembly further comprises an extension member that connects the housing to the means for slideably connecting, and
further comprising:
- a means for allowing the extension member to pivot about the means for slideably connecting in a plane parallel to the longitudinal axis of the rod; and
- a means for locking the extension member to the means for slideably connecting at an angle relative to the rod.

29. The lamp or claim 16, wherein the means for mounting comprise a substantially flat, elongated mounting bracket that runs generally parallel to the rod, and wherein the rod has a length in the range of 6 to 18 inches.

30. The lump of claim 16, wherein the second end of the extension member is fixedly connected to the connector at an angle that is substantially perpendicular to the rod.

31. The lamp of claim 16, further comprising a light socket contained within the light housing, and wherein the light housing directs light in a direction substantially perpendicular to the extension member.

32. The lamp of claim 16, wherein the power cord includes a coiled portion that connects to the second end of the rod and to the connector.

33. The lamp of claim 1, wherein the extension member comprises first and second ends that connect, respectively to the light housing and to the rod, and wherein at least one of the first and second ends comprises a pivotal connection that allows pivotal movement of the extension member.

34. The lamp of claim 5, wherein the rod has a hollow inside portion, and further comprising a power cord that passes through the hollow inside portion.

* * * * *